United States Patent
Beaumont

(10) Patent No.: US 8,838,524 B2
(45) Date of Patent: Sep. 16, 2014

(54) AUTOMATED SYSTEM FOR PREPARING AND PRESENTING CONTROL CHARTS

(75) Inventor: Gregory Robert Beaumont, St. Paul, MN (US)

(73) Assignee: Gnet Group, LLC, Roseville, MN (US)

( * ) Notice: Subject to any disclaimer, the term of this patent is extended or adjusted under 35 U.S.C. 154(b) by 233 days.

(21) Appl. No.: 13/596,046

(22) Filed: Aug. 28, 2012

(65) Prior Publication Data

US 2013/0054510 A1 Feb. 28, 2013

Related U.S. Application Data

(60) Provisional application No. 61/529,069, filed on Aug. 30, 2011.

(51) Int. Cl.
*G06F 17/30* (2006.01)

(52) U.S. Cl.
CPC .................. *G06F 17/30592* (2013.01)
USPC ........... 707/600; 707/607; 707/736; 707/741; 707/805

(58) Field of Classification Search
CPC ................................................ G06F 17/30592
USPC .................. 707/600, 736, 741, 805
See application file for complete search history.

(56) References Cited

U.S. PATENT DOCUMENTS

| | | | | |
|---|---|---|---|---|
| 7,287,022 B2* | 10/2007 | Netz et al. | ..................... | 707/600 |
| 7,657,451 B2 | 2/2010 | Dubois et al. | | |
| 7,743,015 B2* | 6/2010 | Schmitt | ......................... | 707/600 |
| 2005/0289129 A1* | 12/2005 | Schmitt | ............................ | 707/3 |
| 2009/0240663 A1* | 9/2009 | Plattner et al. | .................... | 707/3 |
| 2013/0073520 A1* | 3/2013 | Ng et al. | ...................... | 707/610 |

* cited by examiner

*Primary Examiner* — Frantz Coby

(74) *Attorney, Agent, or Firm* — Craig J. Lervick; Larkin Hoffman Daly & Lindgren, Ltd.

(57) ABSTRACT

To provide large amounts of operations and quality related data to business owners, managers and operators, a system and method are provided to easily produce and present control charts having many different selectable perspectives. To provide this ability, and automated process is followed which calculates and indexes virtually all control chart parameters and stores the information in an OLAP cube structure. Using different types of presentation methodologies, the control charts can be easily generated and altered depending on the desires of the particular user. Since virtually all variations are stored and indexed, when the parameters used to generate the control charts are altered, the system can simply retrieve all necessary information from the indexed OLAP cube structure and quickly generate a visual display of the desired control chart.

18 Claims, 12 Drawing Sheets

EXAMPLE OF A CONTROL CHART RULE. THIS PARTICULAR RULE CALCULATES WHETHER 3 OUT OF 4 MONTHS ARE ABOVE (LOS_1SD_ABOVE). AS MANY RULES AS ARE NEEDED CAN BE GENERATED USING THE FOLLOWING MDX CODE METHODOLOGY:

```
CASE
 WHEN (([MEASURES].[LOSAVG] > [MEASURES].[LOS_1SIGMA_ABOVE]
  AND ([MEASURES].[LOSAVG].[DIM DATE].[HIERARCHY].PREVMEMBER) > ([MEASURES].[LOS_1SIGMA_ABOVE].[DIM DATE].[HIERARCHY].PREVMEMBER)
  AND ([MEASURES].[LOSAVG].[DIM DATE].[HIERARCHY].PREVMEMBER.PREVMEMBER) > ([MEASURES].[LOS_1SIGMA_ABOVE].[DIM DATE].[HIERARCHY].PREVMEMBER.PREVMEMBER)
  AND ([MEASURES].[FACT COUNT] >= 10)
 THEN 1
 WHEN (([MEASURES].[LOSAVG] > [MEASURES].[LOS_1SIGMA_ABOVE]
  AND ([MEASURES].[LOSAVG].[DIM DATE].[HIERARCHY].PREVMEMBER) > ([MEASURES].[LOS_1SIGMA_ABOVE].[DIM DATE].[HIERARCHY].PREVMEMBER)
  AND ([MEASURES].[LOSAVG].[DIM DATE].[HIERARCHY].PREVMEMBER.PREVMEMBER.PREVMEMBER) > ([MEASURES].[LOS_1SIGMA_ABOVE].[DIM DATE].[HIERARCHY].PREVMEMBER.PREVMEMBER.PREVMEMBER)
  AND ([MEASURES].[FACT COUNT] >= 10)
 THEN 1
 WHEN (([MEASURES].[LOSAVG] > [MEASURES].[LOS_1SIGMA_ABOVE]
  AND ([MEASURES].[LOSAVG].[DIM DATE].[HIERARCHY].PREVMEMBER.PREVMEMBER) > ([MEASURES].[LOS_1SIGMA_ABOVE].[DIM DATE].[HIERARCHY].PREVMEMBER.PREVMEMBER)
  AND ([MEASURES].[LOSAVG].[DIM DATE].[HIERARCHY].PREVMEMBER.PREVMEMBER.PREVMEMBER) > ([MEASURES].[LOS_1SIGMA_ABOVE].[DIM DATE].[HIERARCHY].PREVMEMBER.PREVMEMBER.PREVMEMBER)
  AND ([MEASURES].[FACT COUNT] >= 10)
 THEN 1
 WHEN (([MEASURES].[LOSAVG].[DIM DATE].[HIERARCHY].PREVMEMBER) > ([MEASURES].[LOS_1SIGMA_ABOVE].[DIM DATE].[HIERARCHY].PREVMEMBER)
  AND ([MEASURES].[LOSAVG].[DIM DATE].[HIERARCHY].PREVMEMBER.PREVMEMBER) > ([MEASURES].[LOS_1SIGMA_ABOVE].[DIM DATE].[HIERARCHY].PREVMEMBER.PREVMEMBER)
  AND ([MEASURES].[LOSAVG].[DIM DATE].[HIERARCHY].PREVMEMBER.PREVMEMBER.PREVMEMBER) > ([MEASURES].[LOS_1SIGMA_ABOVE].[DIM DATE].[HIERARCHY].PREVMEMBER.PREVMEMBER.PREVMEMBER)
  AND ([MEASURES].[FACT COUNT] >= 10)
 THEN 1
 ELSE 0
END
```

TRANSLATION: IF THREE OUT OF FOUR OF THE PAST MONTHS ARE ABOVE THE 1 SIGMA LINE FROM BASELINE THE CALCULATED MEASURE DISPLAYS A '1', OTHERWISE IT DISPLAYS A '0'.

AS A RESULT OF THIS RULE CALCULATION METHOD, CONTROL CHART RULES FOR ANY STANDARD OR CUSTOMIZED RULE SET CAN BE BUILT INTO THE OLAP CUBE. THE RULES WILL ALSO BE TIED TO ALL OF THE DIMENSIONS OF THE CUBE. THUS, THE CONTROL CHART GENERATION AND RULE CALCULATION PROCESS FOR ALL POSSIBLE DIMENSION MEMBERS ARE INDEXED IN THE CUBE.

Fig. 6B

AUTOMATED SYSTEM FOR PREPARING AND PRESENTING CONTROL CHARTS

BACKGROUND OF THE INVENTION

In virtually every aspect of modern day business, quality control is a critical function. For example, quality control is important for products, processes, services, systems, organizations, etc. As is well understood, quality control is measured in many different ways, depending upon the particular situation.

For the past several years, quality control has become a well adopted business management strategy or style. The Six Sigma business management strategy is a well known methodology for quality control. In essence, Six Sigma methodologies are one method or tool utilized to manage or control the quality of business processes.

One tool utilized in the Six Sigma management strategy is a control chart. Generally speaking, a Six Sigma control chart utilizes statistical rules to determine if a certain measurement or pattern of measurements deviates far enough from an average or baseline value to be considered "unexpected." Stated differently, control chart rules are generally used to distinguish an unexpected or abnormal change from an expected fluctuation in measurements, over time. In this particular case Six Sigma refers to the use of the statistical measure of standard deviation. More specifically, Six Sigma refers to a warning or control limit being set three standard deviations above or three standard deviations below the average or baseline value.

Although the above referenced Six Sigma control chart is well accepted, various similar control charts can also provide meaningful and helpful information for business management. For example, it may be desirable to determine whether changes are one or two standard deviations above or below the designated baseline. This measurement may provide an early indication of a potential issue. Similarly, it may be necessary to change or alter the statistical data set, thus changing the perspective of the control chart. As an example, management may want to focus on one particular aspect of their operations (for example one particular facility, one product line, one manufacturing machine, etc.).

As can be anticipated, the above mentioned control charts involve considerable amounts of statistical data processing. To generate a Six Sigma control chart a database is typically queried to calculate specific variables, or a data set is manually collected for use in digital spreadsheet tools. For example, this typically includes identifying a target data set, determining an average or baseline value for the identified data set and calculating the standard deviation values. This is a very data intensive project and can involve considerable processing, thus requiring significant processing power and time.

To provide additional levels of information to relevant managers, it would be beneficial to provide a tool capable of flexibly generating, and easily modifying control charts as desired. Further, it is desirable to provide a data structure which allows for the necessary data processing to be completed in an efficient and an effective manner, so that various control charts can be more easily developed. Lastly, it is also beneficial to provide a methodology for presenting control chart information to users in a valuable and efficient way.

BRIEF DESCRIPTION OF THE DRAWINGS

Certain objects and advantages of the disclosed embodiments can be seen by reading the following detailed description in conjunction with the drawings in which.

DESCRIPTION OF THE VARIOUS EMBODIMENTS

The overall systems and methods outlined below provide one example of a unique tool for business managers. In the context of quality control, managers are often provided with the ability to use Six Sigma management techniques, while also having the ability to easily modify and alter the variables, dimensions, datasets, etc., without requiring reprocessing from the core database.

Figure 1:
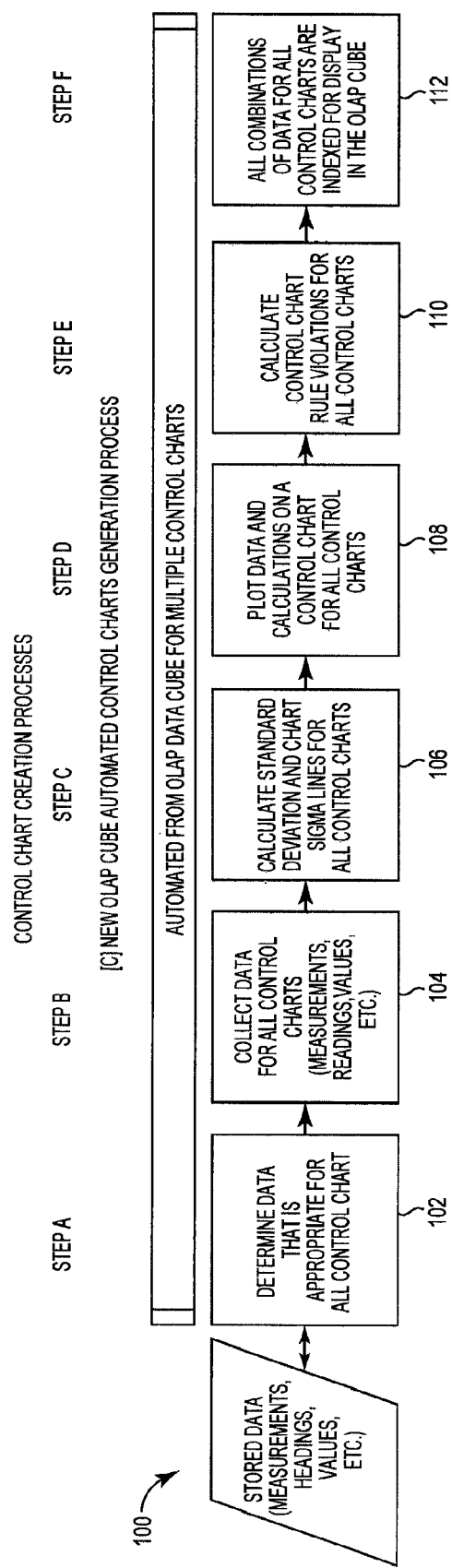
FIG. 1 is process flow diagram illustrating the OLAP Cube Automated Control Chart Creation Process for multiple control charts.
Figure 2:
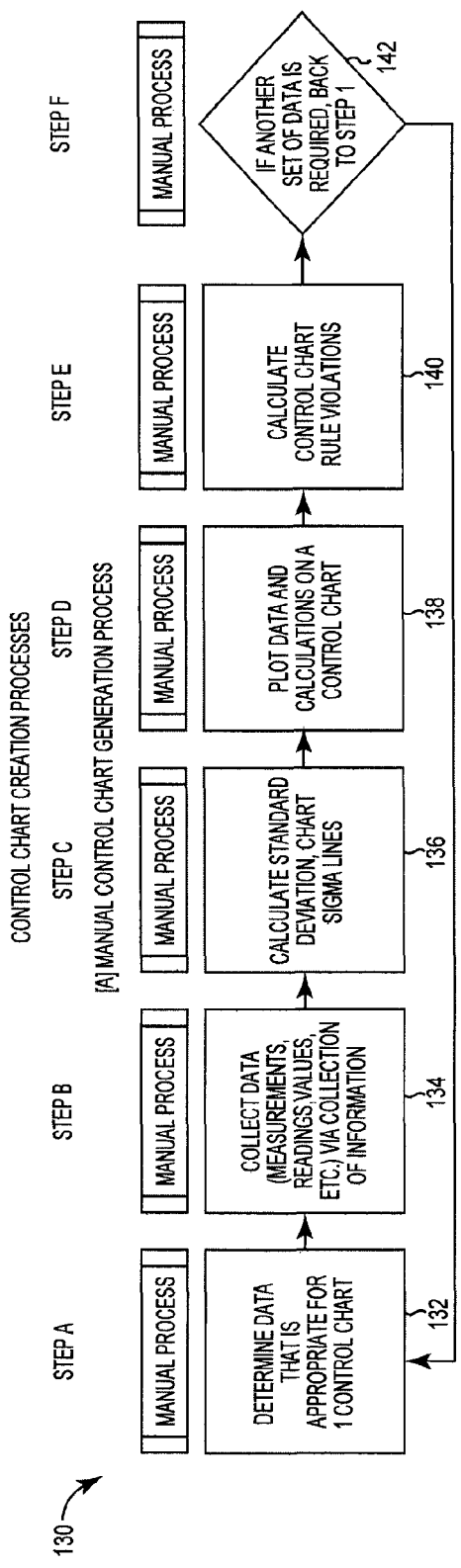
FIG. 2 is a process flow diagram illustrating the traditional Single Control Chart creation methodologies.
Figure 3:
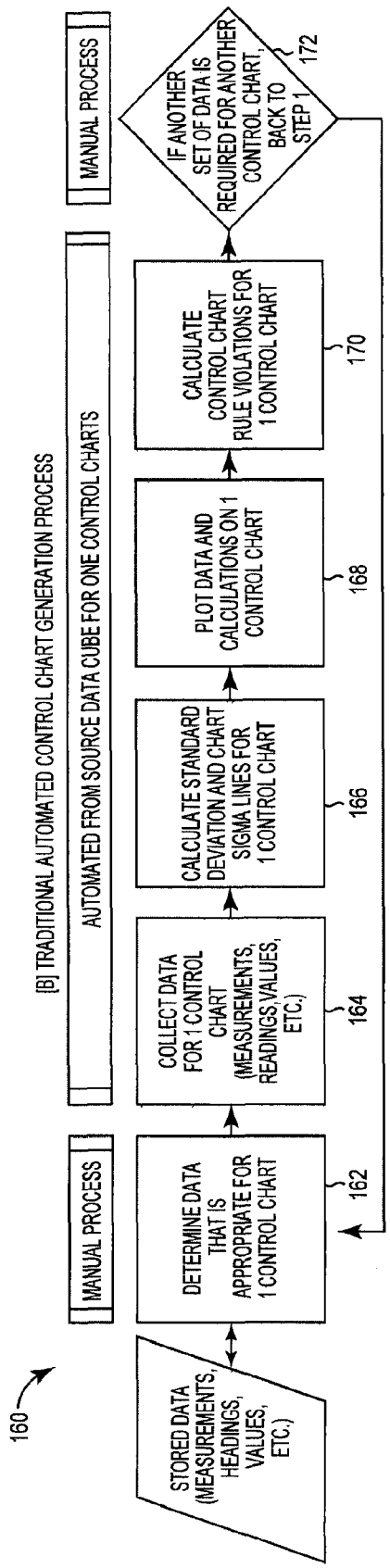
FIG. 3 is a similar process flow diagram showing the Automated Single Control Chart Generation Processes used for producing single charts.

Generally, FIG. 1 illustrates an OLAP Cube Automated Control Chart Creation Process 100 for multiple control charts. In contrast, FIG. 2 shows the Traditional Control Chart creation methodologies 130 and FIG. 3 shows the Automated Single Control Chart Generation Processes 160. The key differences for the OLAP Cube Automated Control Chart Creation Process 100 from both the Traditional Automated Control Chart Generation Process 130 and the Automated Single Control Chart Generation Process 160 are outlined below.

As set forth in FIG. 2, the manual control chart generation process 130 more specifically begins with the manual determination of appropriate data in step 132. The process 130 then includes the collection of data at step 134, the calculation of standard deviation and the charting of sigma lines at step 136. Again, these processes are carried out manually, which is obviously very time consuming. Next, in the Manual Control Chart Generation Process 130, the data and calculations are plotted on a control chart in step 138. Using this information, control chart rule violations are then determined in step 140 so that this information can be flagged and appropriately communicated. Since this process is all carried out on a single set of data, any additions or other parameters must be similarly examined by again repeating each of these same steps.

As also illustrated in FIG. 2, a final analysis step 142 is included in Manual Control Chart Generation Process 130, where the process will revert back to step 132 to identify data appropriate for yet another control chart. As will be appreciated, this cycle is repeated as necessary for the particular application. Again these steps are carried out manually or individually, thus making this process somewhat cumbersome and time consuming.

It is further understood that the steps discussed above in relation to the Manual Control Chart Generation Process 130 could involve some level of automation but each step is typically individually carried out. For example, a computer program may be used for the plotting of data and calculations in step 138, utilizing the information provided. That said, each of these steps are typically carried out individually however, thus requiring the manual transfer of data.

Referring to FIG. 3, the Traditional Automated Single Control Chart Generation Process 160 is also illustrated. Generally speaking this involves very similar steps to the Manual Control Chart Generation Process 130, however, certain pieces have been automated.

Looking more closely at the Traditional Automated Single Control Chart Generation Process 160, the initial step again involves determining data that is appropriate for a particular control chart. Next, in step 164 data is collected for the identified control chart. From this point the next few steps (calculating standard deviation and chart sigma line determination in step 166, plotting data and calculation on control charts in step 168 and the calculation of control chart rule violations in step 170) are all carried out by an automated system. At this point, a completed control chart, with the flagged/identified violations are produced as an output. Using a methodology similar to the manual control chart generation process 130, however, the automated single control chart generation process 160 now requires the manual identification of additional control charts in step 172. Again, this involves additional control charts which might be desired, and restarting the process (at a data determination step 162) which will initiate the process for generation of the subsequent control chart. Generally stated, this determination step 172 involves looping back and starting the control chart generation process from scratch.

To provide further tools and considerably improved efficiency, the New OLAP Cube Automated Control Charts Generation Process 100 handles control chart generation in a different manner. Generally, the New OLAP Cube Automated Control Charts Generation Process 100 concurrently generates all control charts that can be generated from the data set, based upon different combinations of OLAP dimensional parameters. Using the available OLAP tools, these control charts are then saved and simply indexed for future presentation or display.

Referring now more specifically to the new OLAP Cube Automated Control Charts Generation Process 100, it is evident that a unique automated process is used. In the embodiment provided, the process begins by determining data that is appropriate for all control charts in step 102. Next in step 104, the identified data is collected for all of the possible control charts. As examples this data may include measurements, readings, values, etc., as appropriate for the control charts. Next, in calculation step 106, the standard deviation and chart sigma lines are calculated, again for all relevant control charts. Utilizing this information, graphing or plotting step 108 can then generate an image making up the control chart as desired. Using the basic tools inherent in control charts, violations are identified in step 110 and presented in the generated control chart. In the process, these violations are appropriately flagged and identified as desired (e.g. these could be specifically communicated to a manager). Next, in storage step 112 all combinations of data and all corresponding control charts are then indexed and stored in the OLAP Cube.

As appreciated, the OLAP cube storage methodology allows this vast amount of data to be easily stored and indexed. Those familiar with the control charts will appreciate that this process is carried out, all variations for control charts and are easily and quickly available to managers/employees/organizations for appropriate use in the management of their businesses.

As illustrated in the discussion above, the process steps are manually implemented for the Manual Control Chart Generation Process 130. Some of these steps are automated when generating a single control chart in the Traditional Automated Single Control Chart Generation Process 160, which then produces the desired control chart based upon the selected data. In each case, only a single control chart is developed using these processes. In order to develop a subsequent control chart, the process must be restarted. This can be inefficient and cumbersome for business managers who are trying to use these control charts to increase the efficiency of their processes.

Figure 4:
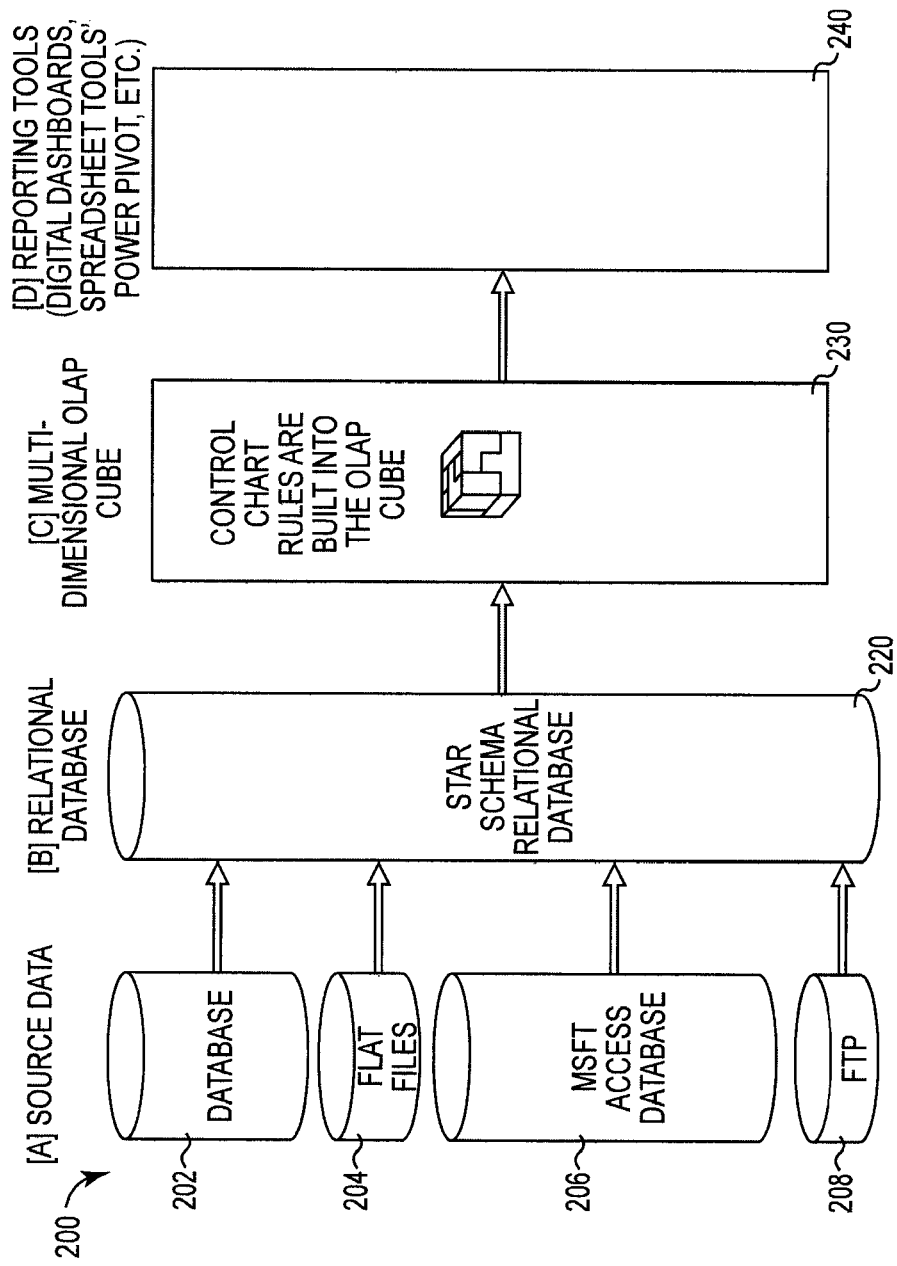
FIG. 4 is a data structure illustrating typical data flow for one embodiment.
Figure 5A:
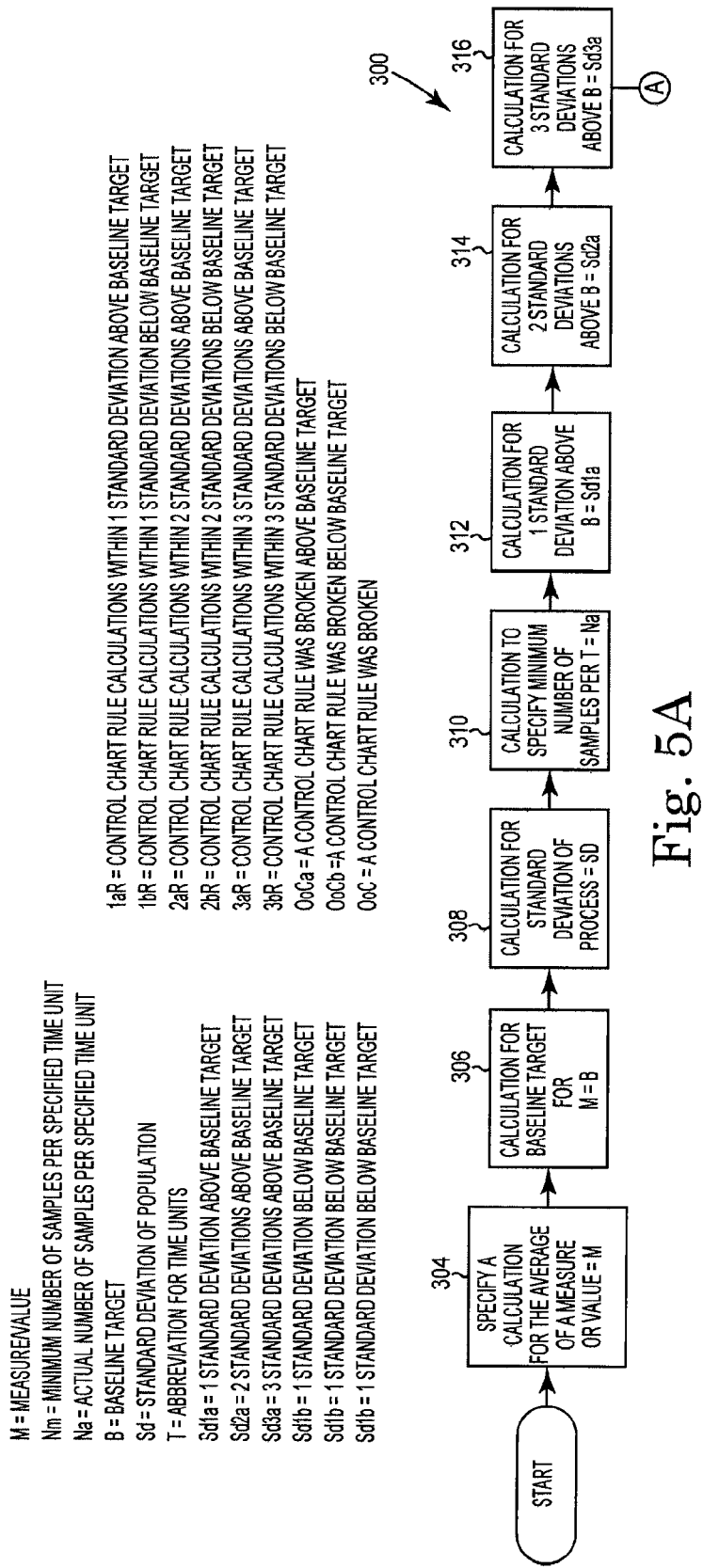
FIG. 5 is a flow chart showing certain data processing operations.
Figure 5B:
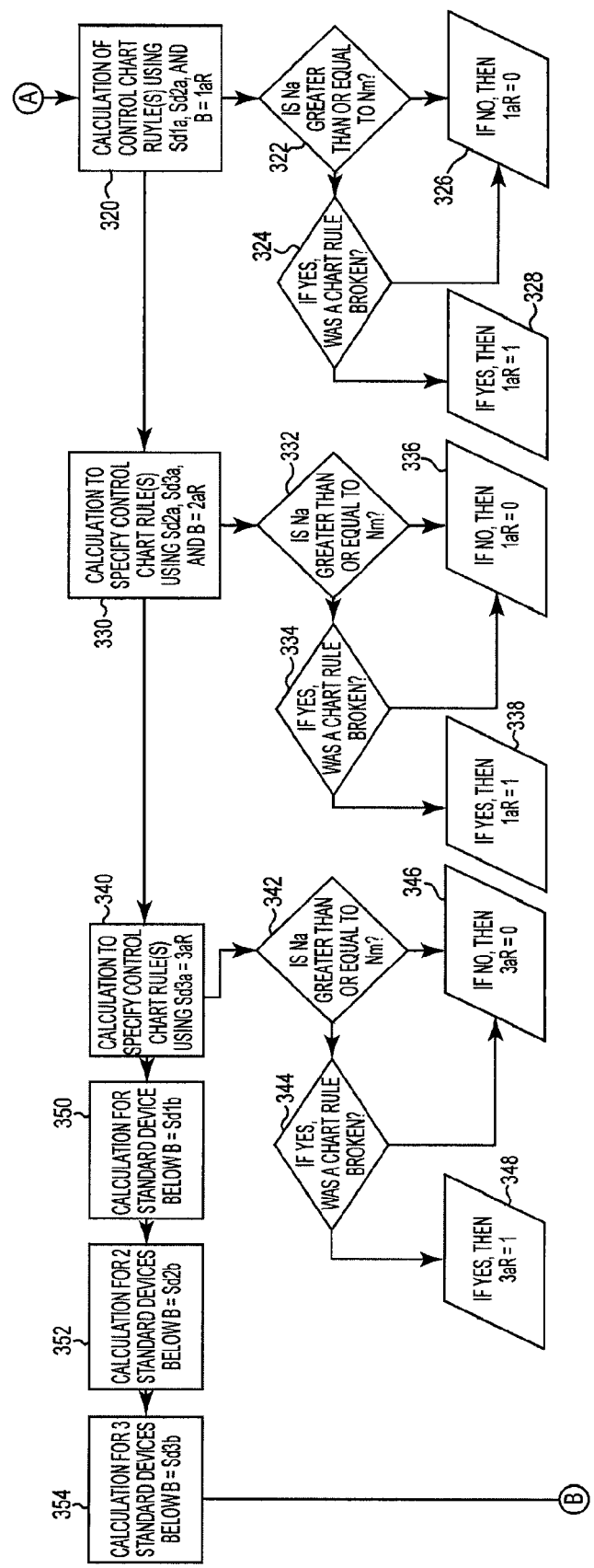
Figure 5C:
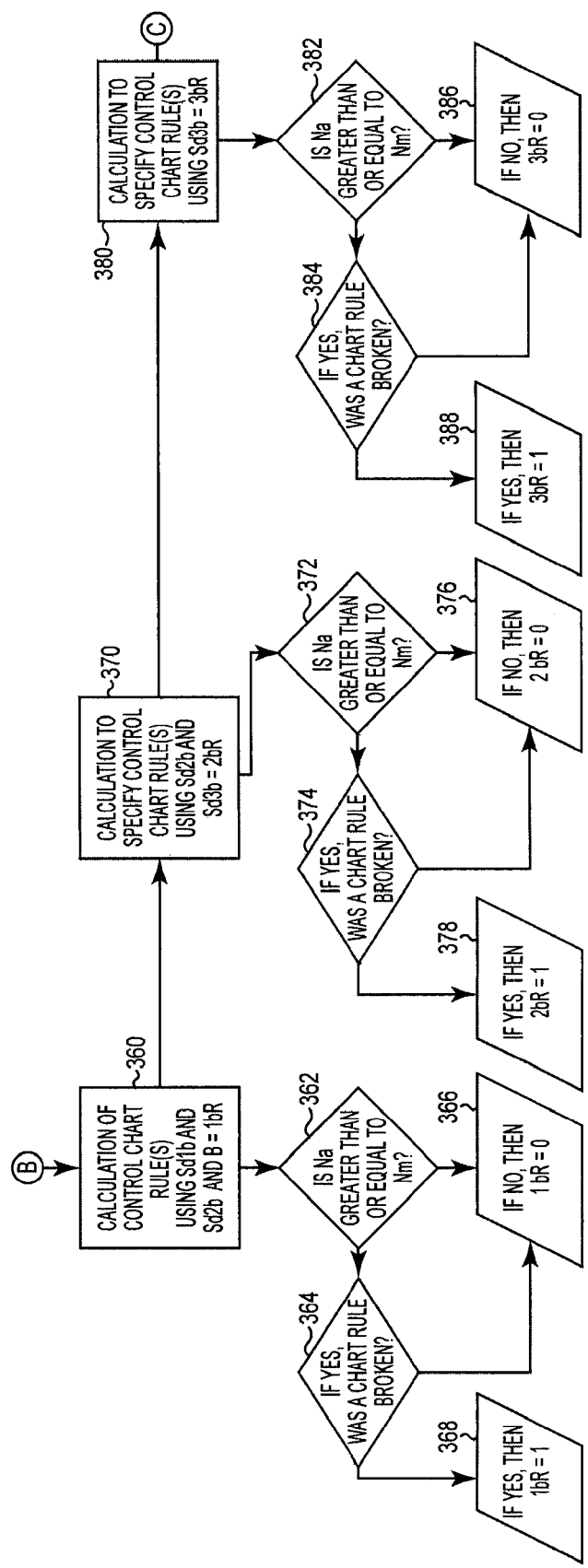
Figure 5D:
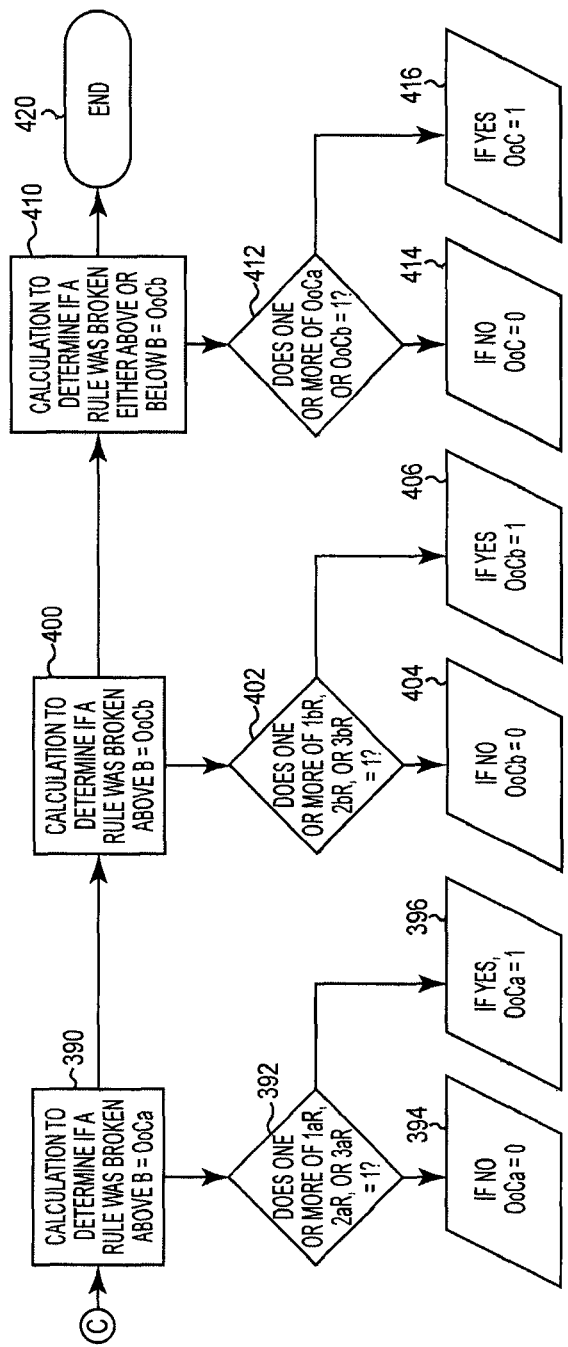

Referring now to FIG. 4, a high level dataflow diagram illustrates one embodiment of the dataflow involved to provide the above mentioned functionality. This dataflow enables the tools and processes to operate in a manner to allow a user to easily create, modify and adjust control charts as desired. Generally speaking the following elements are utilized:

Source Data 200: Source data can come from many different source systems and is typically specific to the type of control charts involved. Traditional databases, spreadsheets, flat files, and data feeds can all be sources of data. Referring now specifically to FIG. 4, the various locations where source data may be obtained include typical databases 202, flat files 204, Microsoft access databases 206, and FTP files 208. This provides some examples of the possible data source, however it is understood that other sources may exist, as suggested above.

Relational Database 220: In the illustrated system, source data systems are queried using established integration methods into a star schema relational database 220. Star schema database 220 is de-normalized to maximize storage space efficiency and create a design that renders detailed queries manageable. The star schema database is then utilized as a subsequent source for data. The star schema database 220 is one example relational database utilized in the illustrated system. That said, alternatives are clearly available and well understood by those skilled in the art.

Multi-Dimensional OLAP Cube 230: The OLAP cube 230 is built using the database tables from the star schema relational database 220. The OLAP cube 220 is technically a separate database. It is designed to aggregate measures such as count of rows, sum of values, etc. that are found in the relational database tables. The OLAP cube 230 is also where the custom calculations are built for the Control Chart generation process. As is well understood by those skilled in the art, OLAP is an acronym for Online Analytical Processing, and is a well understood data management structure. In this particular case, the OLAP cube structure is very beneficial for performing the various data processing operations desired.

Reporting Tools 240: Generally speaking, the reporting tools 240 are various devices, systems or programs that are used to display the control chart data and calculations for users. These reporting tools 240 display charts, grids, and lists to provide an understandable format to interpret the calculated results. As will be more fully described below, one particular reporting tool is the digital dashboard specifically developed by the presently disclosed system. Utilizing the tools and mechanisms outlined above, this digital dashboard allowed multiple perspectives and dimension to the easily displayed to a user, while also allowing easy modification of the subject control charts.

As generally discussed above, the present system and process provide for the convenient and efficient creation, modification and management of control charts. To accommodate this, certain processes take place to incorporate the control chart rules and build them into an OLAP cube. FIG. 5 illustrates a flow chart showing one example of the logical process utilized to do this. In summary, the logical flow illustrated in flow chart 300 of FIG. 5, a process measure or value (M) within a dataset, is analyzed using six sigma control charts to determine if a particular process is "out of control". Stated differently, the analysis determines if the particular process measure being analyzed is outside the accepted or predetermined quality ranges. With this information, management can then review the particular process to see where improvements can be made. Generally speaking the flow chart 300 outlines one method for performing this analysis using baseline targets (B), first, second and third deviations above and below the baseline target (Sd1a, Sd2a, Sd3a, Sd1b, Sb2b, and Sd3b), and various control chart rules (1aR, 1bR, 2aR, 2bR, 3aR, and 3bR). Using this information, the process shown in flowchart 300 thus shows the logical flow for carrying out the functions of relative to one selected rule set. In this particular example, the logical algorithm would be processed and indexed for every possible control chart, based upon the OLAP cube specifications, and indexed for query and display on a digital dashboard in the OLAP cube. It is clearly understood that certain modifications and alternative approaches could be utilized to achieve the same result for a modified version of logical rules.

As illustrated in FIG. 5, the process for determining control chart values begins at starting point 302, and quickly moves to step 304 where the measure or selected value utilized is specified or identified. For example, the measure to be analyzed could be the average length of stay in a particular medical facility during a particular month. The average of the selected measured values is also determined and stored. Next, the baseline target for the particular control chart is set to the stored average value in step 306. Following the calculation/designation of the baseline, the process then moves on to determine standard deviations and related control chart values. As a first step in determining specific control chart values, the process designates a minimum number of samples per time period required for the calculation (step 310). This minimum number of samples (Na) is then saved for further use in the process.

Using the information already determined, calculations are then made to determine one standard deviation, two standard deviations, and three standard deviations above designated baseline value (steps 312, 314, and 316 respectively). Once these values have been determined, an analysis process can begin. Stated differently, the details of the control chart can be further analyzed to determine if rule violations have occurred. More specifically, step 320 begins this process of analyzing whether the control chart rules were broken. First, in step 322 the process determines whether an appropriate number of samples have been provided so that the measured value calculation is valid. Generally speaking, the process then utilizes the values of one standard deviation (Sd1a) and two standard deviations (Sd2a) above the baseline and determines if the measured value is between those two values. In step 324 the analysis determines if a control chart rule is broken. More specifically, was the average measured value for the period of time (M) greater than one standard deviation above the baseline target (Sd1a). If yes, in step 328 the value 1aR (control chart rule one standard deviation above baseline target) is set to a logical "1". If the rule is not broken, step 326 sets the value 1aR to a logical "0".

Next, the process moves on to determine whether the average measured value (M) was between two standard deviations (Sd2a) and three standard deviations (Sd3a) above the baseline target. Once again, a similar process is carried out to first determine if an appropriate number of samples have been included (step 332), and then to determine if the control chart rule has been broken (step 334). If this particular rule has been broken, the value 2aR is set to a logical "1" in step 338. Similarly, if a rule has not been broken the variable 2aR is set to a logical "0". As shown in FIG. 5, identical steps are carried out to determine if control chart rules have been broken for three standard deviations (Sd3a) above the baseline (see steps 340, 342, 344, 346 and 348). Similarly, a virtually identical process is carried out using standard deviation values below the baseline (i.e. Sd1b, Sd2b and Sd3b). More specifically, the measured value is compared with all calculated standard deviation values below the baseline (i.e., examining to determine if the measured value was below one standard deviation, two standard deviations, or three standard deviations below the baseline target). In these various steps, similar variables are set to logic 1 or logic 0 indicating whether or not control chart rules have been broken.

Once each of the analytical steps are carried out which compare the measured values with various calculated standard deviation values, the process then moves to step 390 to determine and flag whether any control chart rule above the baseline target broken. This analysis is done in step 392 and an appropriate variable indicating control chart rules above the baseline target (OoCa) is set to logical "1". Similarly, if any control chart rules below the baseline were broken, a similar variable (OoCb) is set to a logical "1". Lastly in steps 410 through 416, a flag is set to indicate whether any control chart rules have been broken. The system of the present invention can then utilize this information to flag and identify those cases where control chart rules have been broken. The process then ends at step 420. As further discussed below, this process is carried out and stored for each possible measure contemplated by a user. The values and analysis are stored in an OLAP cube for further reference.

Figure 6A:
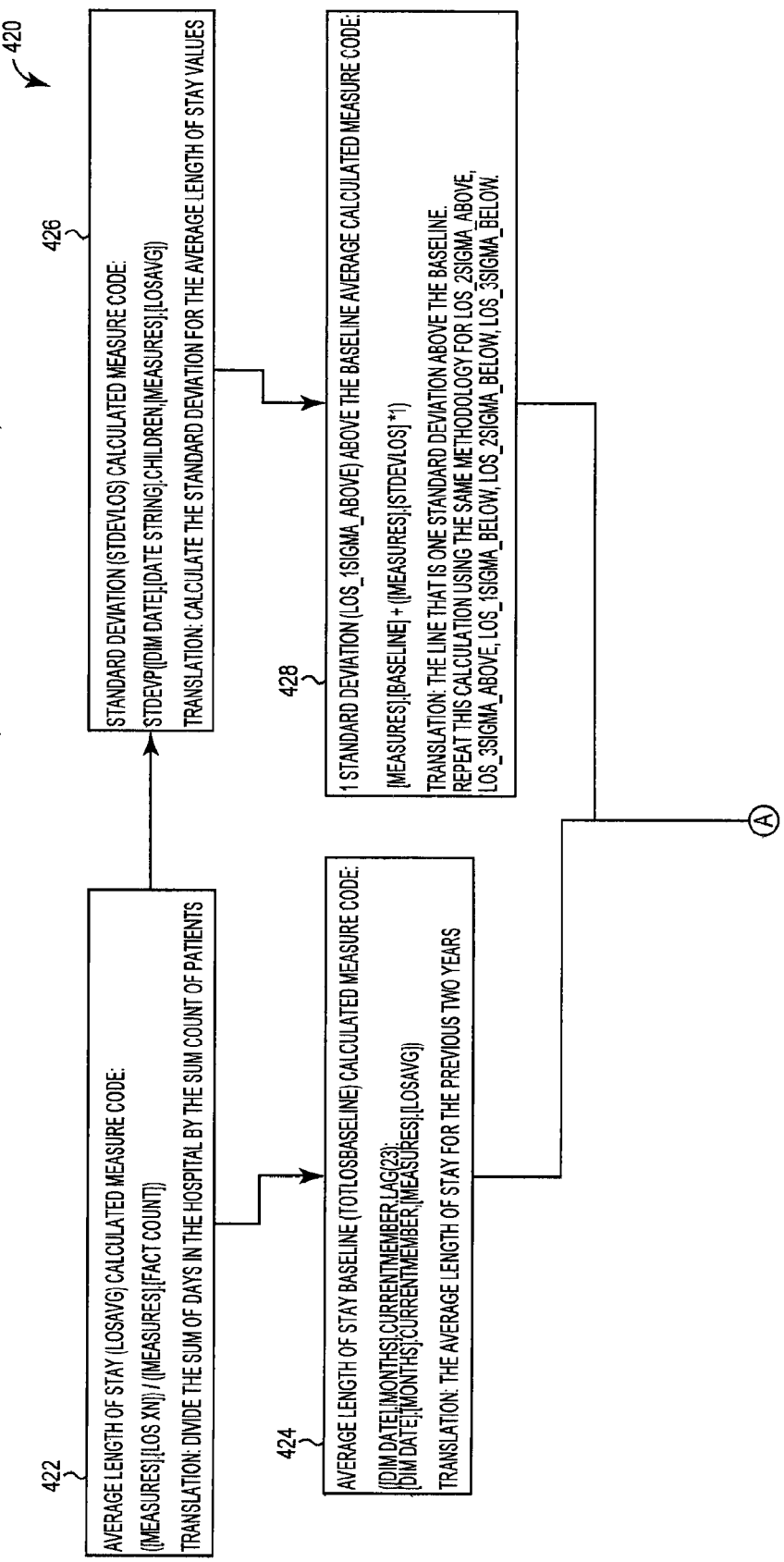
FIG. 6 is a programming illustration presenting examples of how the processes are carried out via programming steps.

As a follow on to the flow chart of FIG. 5, FIG. 6 provides a specific example of how a control chart rules can be calculated using calculations in an OLAP cube. In this particular example, the calculated rule is created for use in a healthcare application. More specifically, this example evaluates when the average length of stay in a healthcare facility is more than one standard deviation above the long-term average for three out of four months in a row. Although not limited to a specific programming language, the language used for the example given is MDX (Multi-Dimensional Expression Language).

Referring now specifically to FIG. 6, the overall calculation process 420 begins by establishing the average length of stay in step 422. This is a statistical average based upon a relatively large sampling of patent data. Next, in step 424 the average length of stay for the previous two years is calculated. In a similar manner, step 426 involves the calculation of a standard deviation for the average length of stay based upon the statistical data provided. In step 428 the "standard deviation lines" are developed. In this example, this step identifies the levels at which the statistical information determined were one standard deviation above and below the baseline, two standard deviations above and below a baseline, and three standard deviations above and below the baseline. This information is then all passed on and utilized in the next calculation which analyses the average stay the previous two years against statistical averages over a larger period of time. In summary, the MDX language code set forth in step 430 determines if three out of the past four months are above the one standard deviation line from the baseline. If this evaluation is true, this information is then flagged and presented in step 432 utilizing appropriate presentation tools.

Figure 7:
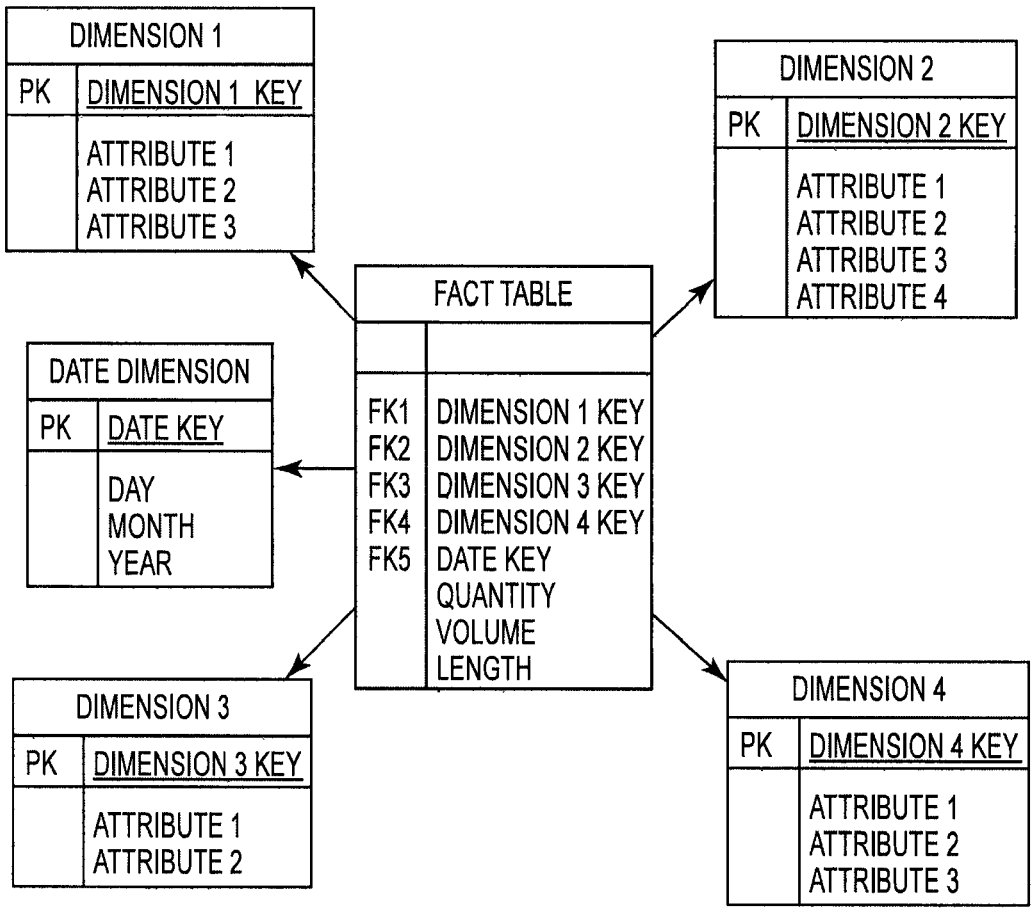
FIG. 7 is a multidimensional diagram illustrating the data tables in a star schema database and their relationships for processing into an OLAP cube.

As mentioned above, the incorporation of control chart rules in the OLAP cube provide considerable processing efficiencies. In order to generate the necessary OLAP cube, the Star Schema Database discussed above is appropriately related for processing into the OLAP cube. FIG. 7 illustrates the appropriate relationships, and generally shows how the OLAP cube is developed from a star schema relational database. FIG. 7 is one example of a star schema design, and designs containing additional Fact tables and Dimension tables can also be used for this methodology.

Figure 8:
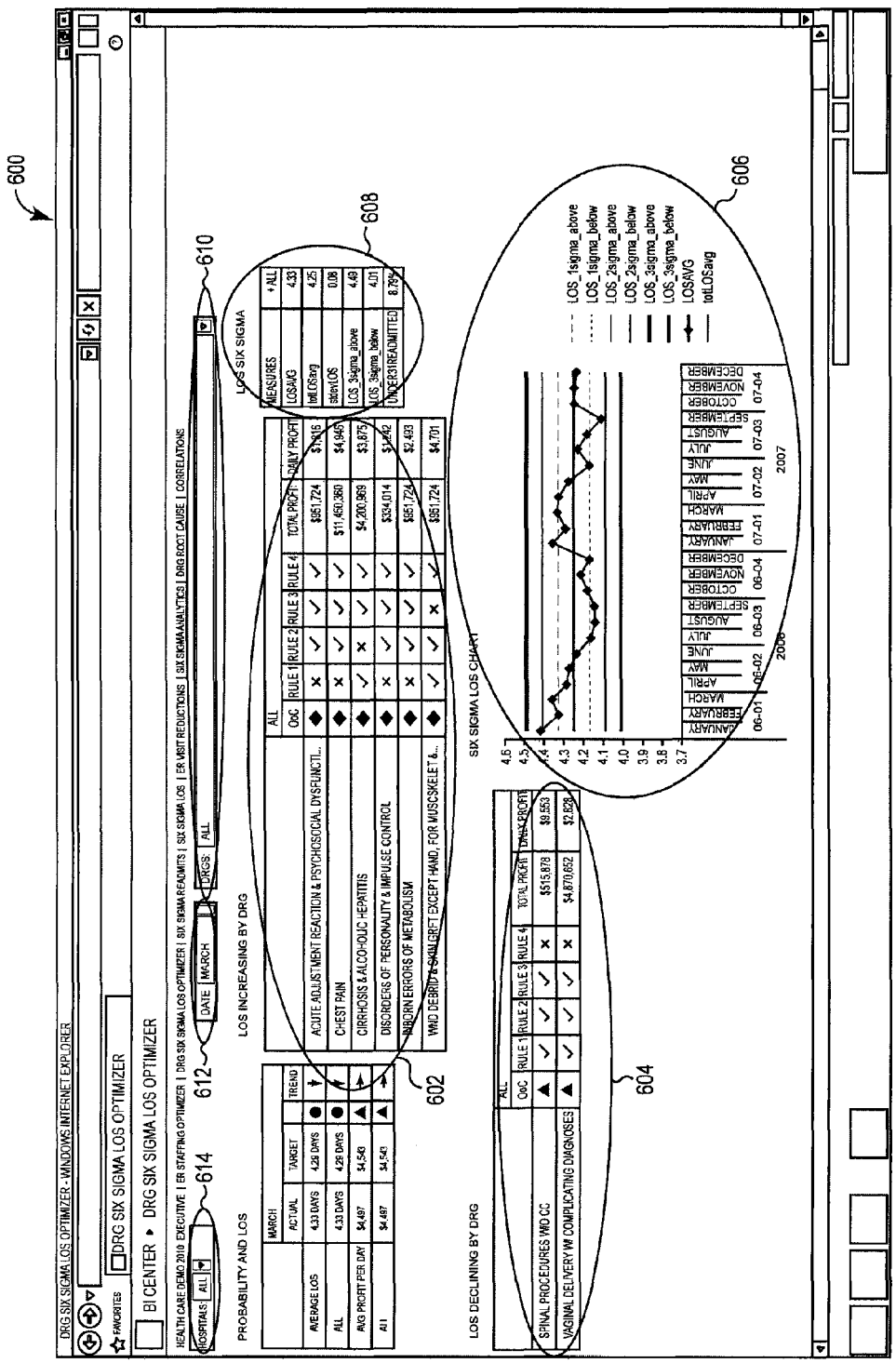
FIG. 8 is an illustration showing one exemplary digital dashboard for presenting control charts to a user.

FIG. 8 illustrates a snapshot from a working example of how the Control Charts can be displayed on a digital dashboard. Again, this particular example illustrates how the data from the OLAP cube can be displayed and used in a healthcare setting. More particularly, this example shows a digital dashboard monitoring patient length-of-stay at a group of hospitals. The data used on the control chart is identifies the average length-of-stay for hospital inpatients for a large sampling of instances. Further, this example separates the length of stay values by Diagnosis Related Groups (DRG) so management of the health care facilities can identify certain groups or areas where problems may exist. The purpose of the dashboard in this particular example is to display when the average number of days that patients stay at a hospital is going up or down with statistical significance as determined by four control chart rules.

As shown in FIG. 8, digital dashboard 600 includes various fields and areas which are significant. In this particular illustration, the various areas have been circled for ease of reference. To provide additional context, each of these sections are discussed in further detail below.

Starting with a central portion of the dashboard 600 shows a flagged list 602 (labeled "LOS Increasing by DRG" 602). Here, flagged list 602 contains a list of the members of the dimension "DRG" in the OLAP cube that broke one of four Control Chart rules in the identified month (see month identifier 612, here identifying the month of March) for All Hospitals combined. Note that "All Hospitals" are selected in selector section 614. In this example, the list 602 only contains members that broke the identified rules in the relevant control charts. In this particular example, there are over 600 DRGs in the DRG dimension (see DRG Selection Box 610) for which control charts were indexed within the OLAP cube. Here rule calculations are done for a selected month 612 (e.g. March) and the selected hospitals 614 (e.g. All Hospitals). In this example dashboard 600, the OLAP Control Charts rule calculations have filtered out and listed six DRG members (from the list of over 600) that have length-of-stay values that are statistically increasing.

As suggested, the example shown in FIG. 8 presents information related to the length of stay within an identified group of hospitals. As a more specific example, this analysis may involve ten (10) hospitals with 600 different DRGs being used. Using this example, the underlying analysis requires the generation of 6,000 different control charts for each identified period of time. To allow the system to quickly and easily present this information to users, each of these 6,000 control charts are automatically calculated and stored by the illustrated system. Further, these are filtered to identify those instances where the identified measure (here, length of stay for particular DRGs) is considered to be "out of control". The filtered measures are then clearly presented to a user as part of flagged list 602 shown on dashboard display 600.

It should be noted that the "out of control" process measures are easily identified by simply examining the variables "OoC", "OoCa" and "OoCb" discussed above in relation to FIG. 9. As mentioned, these variables are set to a logical "1" when rules are broken, thus providing a straight forward mechanism for creating flagged list 602.

Turning again to FIG. 8, the lower left portion 604 (i.e. web part labeled "LOS Declining by DRG") of dashboard display 600 is similar to the flagged list 602 ("LOS Increasing by DRG,"), but it filters out members from the whole DRG dimension that have length-of-stay values that are statistically decreasing.

The lower right web part 606 labeled "Six Sigma LOS Chart", displays the control chart for the selected filtered DRGs 610, and Hospitals 614 over a two year period of time. If the members selected for any of those filters are changed, the control chart will be rendered again to display appropriate data from a different Control Chart data set indexed in the OLAP data cube.

Lastly, the upper right web part 608 labeled "LOS Six Sigma", pulls the actual data values for the Control Chart 606 which are indexed in the cube. As with the Control Chart 606, the values will render to meet the selections in the filters for DRGs 610, Date 612, and Hospitals 614.

Figure 9:
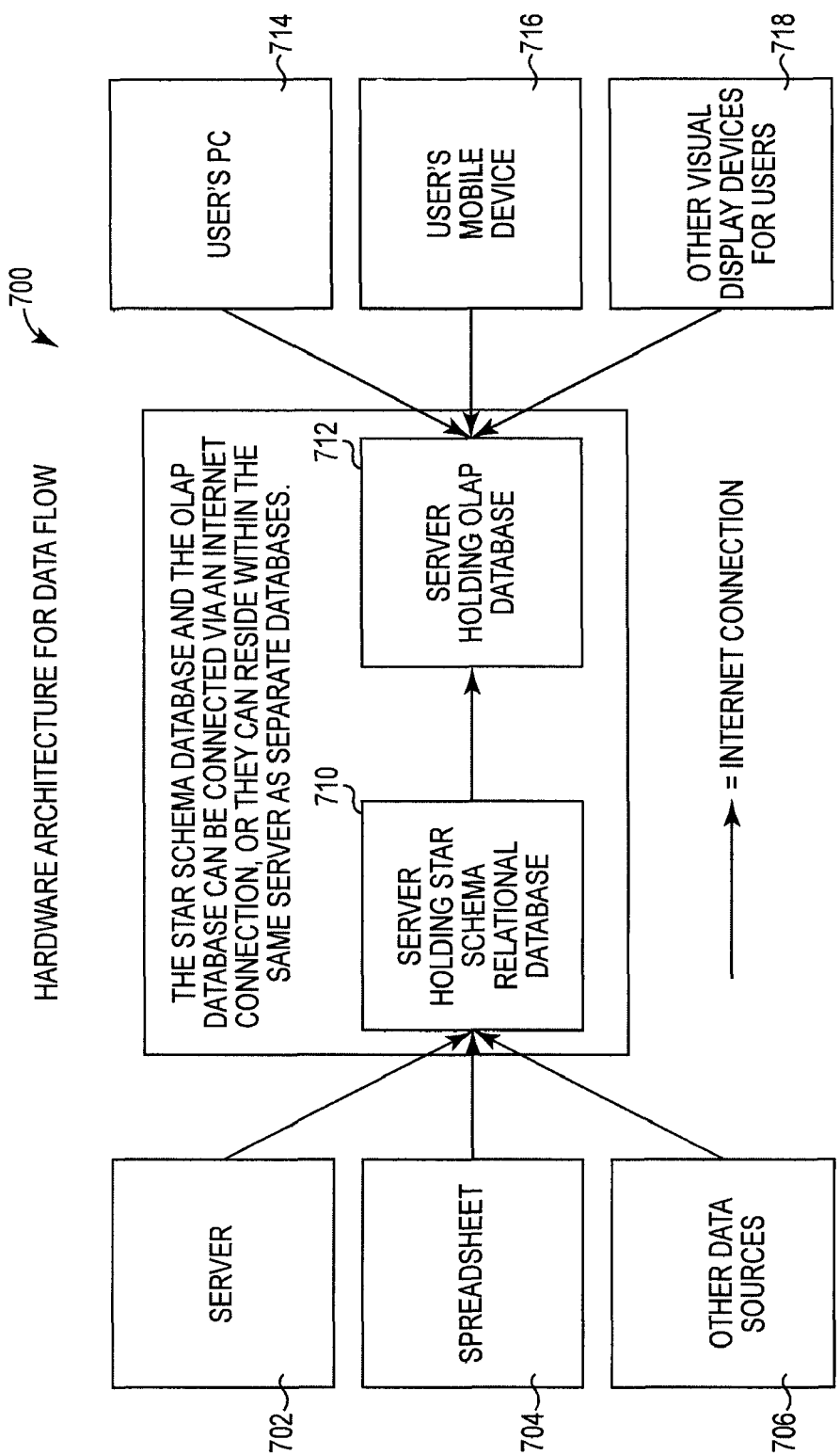
FIG. 9 is an illustration of the hardware architecture in which the methodology is implemented.

FIG. 9, illustrates one example of the hardware architecture 700 through which data flows and is processed for the implementation of the Control Chart methodology. Data sources used in this example system include a server 702, spreadsheet 704, and other data sources 706. The arrows on FIG. 9 indicate an internet connection by which data is transferred to the star schema database 710. The data from the star schema database 710 is then processed into the OLAP database 712. In this example, star schema database 710 and OLAP database 712 can either be separate servers, or reside within the same server. The server holding OLAP database 712 is then queried by various hardware devices such as personal computer 714, a mobile device 716, or any other devices 718 that can display the Control Charts and Control Chart rule calculations on digital dashboards. Naturally, variations on the above described hardware could be equally efficient.

The systems and processes described above provide several examples of how the present invention could be embodied. It will be clearly understood that several modifications could be made in the steps or systems utilized. It is intended and understood that the present invention is adaptable in these ways, and not limited to the specific embodiments described above. As one specific example, specific coding languages and techniques have been referenced above. It is recognized and understood that many alternative coding languages and techniques could be used. Additionally, the specific processes discussed above could be altered to be carried out in different order or to take different forms. It is intended that all variations coming within the scope and spirit of the following claims be covered and included as part of the present application.

What is claimed is:

1. A system for efficiently presenting performance data to a user related to a predetermined processes, comprising:
   a database containing data related to a plurality of process measures;
   a processor in communication with the database;
   memory in communication with the processor, the memory containing instructions for causing the processor to create a tailored OLAP cube by applying predetermined rules to the data in the database, wherein the predetermined rules include process evaluation rules tailored for the automatic creation of a plurality of control charts and related dimension rules which are based upon a plurality of different dimensions of the data;
   a user interface in communication with the processor, and a display in communication with the processor for presenting predetermined reports to the user;
wherein the memory further contains instructions allowing the user to enter selected criteria using the user interface which causes the processor to access the OLAP cube and produce a resulting report using only information in the OLAP cube, and wherein the instructions further allow the user to revise the selected criteria and thus create a subsequent predetermined report again using only information in the OLAP cube.

2. The system of claim 1 wherein the resulting reports comprise control charts based upon rules set forth in the selected criteria.

3. The system of claim 1 wherein the selected criteria include the identification of dimensions to be used in creating a set of six-sigma control charts, and wherein the predetermined rules used to create the OLAP cube correspond to each of the plurality of dimensions thus automatically causing the creation of control charts for each of the dimensions.

4. The system of claim 2 wherein the report is a dashboard structure presented on the display, wherein one section of the dashboard includes at least one of the control charts.

5. The system of claim 4 wherein the dashboard structure includes a flagged list identifying instances where a process measure violates a rule.

6. The system of claim 5 wherein the flagged list identifies the process measure and the violated rule.

7. A method for automatically calculating and storing control chart data so that selected control charts can be easily generated and displayed, the method comprising:
identifying measurement data related to at least one process measure and appropriate for a plurality of possible control charts;
collecting the measurement data;
calculating all control chart data for each of the plurality of possible control charts, wherein the control chart data includes a plurality of varied values based upon a predetermined measurement methodology;
storing and indexing the control chart data for each of the plurality of possible control charts in an OLAP cube configuration;
presenting a dashboard presentation structure to a user, wherein the dashboard structure includes a plurality of selectable parameters and at least one graphical control chart using the selectable parameters and at least one flagged list indicating if the process measure has violated a rule within the at least one of the plurality of possible control charts, wherein the control chart is created by retrieving the control chart data from the OLAP cube structure based upon a set of selected parameters and the flagged list is created by analyzing the control chart data.

8. The method of claim 7 wherein measurement data is collected for a first period of time and the control chart values are calculate for a second period of time, wherein the second period of time is greater than the first period of time.

9. The method of claim 8 wherein the selectable parameters include the measure, the first time period, and the second time period.

10. The method of claim 9 wherein the selectable parameters can be changed, resulting in the representation of the dashboard presentation which includes the at least one graphical control chart.

11. The method of claim 10 wherein the representation of the dashboard and the representation of the control chart is achieved by the retrieval of previously calculated information from the OLAP cube.

12. The method of claim 7 wherein the at least one process measure includes a plurality of process measures which are identified and all possible control charts are identified for each of the plurality of process measures.

13. The method of claim 12 wherein the plurality of process measures are included in the dashboard presentation as selectable parameters.

14. An automated method for efficiently preparing and storing control chart data for a plurality of measures and efficiently presenting user selected control charts, comprising:
accessing stored data which includes data for the plurality of measures;
automatically determining which measures in the plurality of measures that is appropriate for control chart analysis;
collecting data necessary for the calculation of a plurality control chart corresponding to all of the determined measures;
calculating all control chart values required for each of the plurality of control charts corresponding to the determined measures and storing all calculated control chart values;
plotting data and control charts for each of the plurality of control charts and storing the plotted data and control charts;
analyzing each of the plurality of control charts and plurality of measures to determine any control chart violations for any of the plurality of control charts and storing any determined violations; and
indexing the stored calculated control chart values, plotted data, control charts, control chart violations to be easily accessed by a user using a dashboard user interface.

15. The automated method of claim 14 wherein the stored data, calculated control chart values, plotted data, control charts, and control chart violations are stored in an OLAP cube configuration.

16. The automated method of claim 15 wherein the plurality of control charts are six sigma control charts.

17. The automated method of claim 16 further comprising presenting the dashboard user interface wherein the user is allowed to select a measure from the plurality of measures and the corresponding control chart is presented including the calculated control chart values, the plotted data and any control chart violations.

18. The automated method of claim 17 wherein any control chart violations are presented in a flagged list.

* * * * *